(12) United States Patent
Liang

(10) Patent No.: US 8,368,670 B2
(45) Date of Patent: Feb. 5, 2013

(54) STYLUS CAP STRUCTURE AND ASSEMBLY

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 329 days.

(21) Appl. No.: 12/869,877

(22) Filed: Aug. 27, 2010

(65) Prior Publication Data

US 2011/0226537 A1 Sep. 22, 2011

(30) Foreign Application Priority Data

Mar. 18, 2010 (CN) .......................... 2010 1 0127041

(51) Int. Cl.
*G06F 3/033* (2006.01)
*G06F 3/041* (2006.01)
*G06K 11/06* (2006.01)
*G08C 21/00* (2006.01)

(52) U.S. Cl. ..................................... 345/179; 178/19.01
(58) Field of Classification Search ............... 178/19.01; 401/202, 213, 215, 243–247, 262
See application file for complete search history.

(56) References Cited

U.S. PATENT DOCUMENTS

| | | | | |
|---|---|---|---|---|
| 4,601,599 A | * | 7/1986 | Katoh | 401/99 |
| 4,667,182 A | * | 5/1987 | Murphy | 340/407.2 |
| 4,844,642 A | * | 7/1989 | Inaba et al. | 401/213 |
| 5,193,897 A | * | 3/1993 | Halsey | 362/118 |
| 5,818,431 A | * | 10/1998 | Oh et al. | 345/179 |
| 6,191,778 B1 | * | 2/2001 | Chery et al. | 345/173 |
| 6,985,138 B2 | * | 1/2006 | Charlier | 345/179 |
| 7,001,093 B2 | * | 2/2006 | Rosso | 401/131 |
| 7,794,167 B2 | * | 9/2010 | Lapstun et al. | 401/195 |
| 2004/0150631 A1 | * | 8/2004 | Fleck et al. | 345/179 |
| 2009/0122029 A1 | * | 5/2009 | Sin | 345/179 |
| 2012/0043142 A1 | * | 2/2012 | Grivna | 178/19.03 |

* cited by examiner

Primary Examiner — Joe H Cheng
Assistant Examiner — Nathan Brittingham
(74) Attorney, Agent, or Firm — Altis Law Group, Inc.

(57) ABSTRACT

A cap assembly for protecting a head of a stylus, the cap assembly comprise a hollow cap and a resisting element. The cap has chamber defined therein. The resisting element is mounted in the chamber, the resisting element includes a resisting portion that has a receiving space defined therein. The receiving space has a shape and profile conforming to the head; so when the head is received in the receiving space, the head resisting an inner surface of the receiving space.

16 Claims, 6 Drawing Sheets

STYLUS CAP STRUCTURE AND ASSEMBLY

This application is related to co-pending U.S. patent applications Ser. No. 12/840,453, entitled "STYLUS", by SHI-XU LIANG. This applications has the same assignee as the present application and has been concurrently filed herewith. The above-identified applications are incorporated herein by reference.

BACKGROUND

1. Technical Field

This exemplary disclosure generally relates to retractable/extendable styluses.

2. Description of Related Art

A typical stylus includes a housing, a retractable stylus body slidably accommodated in the housing and having a tip formed one end thereon, and a cap covering and protecting the tip. To retract the stylus body, an exterior force is directly exerted on the tip to make the stylus body retract into the housing. Thus, the tip may be easily damaged after the tip is used many times.

Therefore, there is room for improvement within the art.

BRIEF DESCRIPTION OF THE DRAWINGS

Many aspects of the exemplary embodiment can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
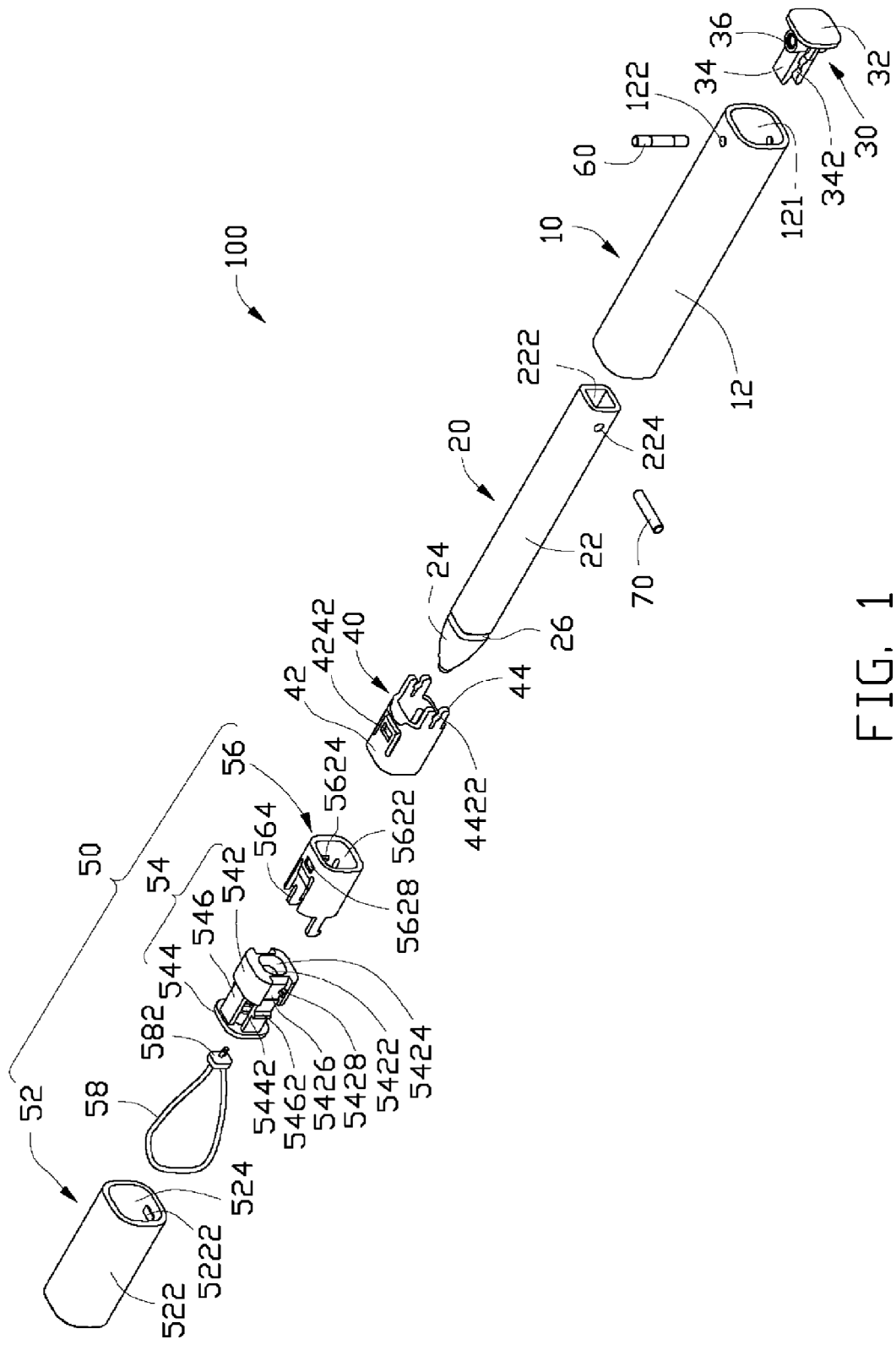
FIG. 1 is an exploded view of an exemplary embodiment.

Referring to FIG. 1, the stylus 100 includes a housing 10, a stylus body 20 retractably mounted in the housing 10, a first stopping element 30 located near one end of the housing 10, a second stopping element 40 located near the other end of the housing 10, and a cap assembly 50 for covering and protecting the stylus body 20. The first stopping element 30 is mounted to the housing 10 by a pin 60. The stylus 100 further includes a post 70 mounted on the stylus body 20, and the post 70 selectively latches with the first stopping element 30 and the second stopping element 40.

The housing 10 is hollow, and longitudinally defines a receptacle 121 therethrough. The housing 10 further includes two aligned retaining holes 122 defined at one end thereof. The housing 10 may further includes two opposite blocks 124 (see FIG. 2) protruding from an inner surface thereof for retaining the second latching element 40 in the receptacle 121.

The stylus body 20 is slightly smaller than the receptacle 121 of the housing 10 so the stylus body 20 can be accommodated in the receptacle 121 and slides relative to the housing 10. The stylus body 20, in this exemplary embodiment, includes a hollow body 22 and a head 24 protruding from one end of the body 22. The body 22 longitudinally defines a compartment 222. The head 24 has a retaining slot 26 defined near the body 22. The retaining slot 26 is for holding the cover 60 on the stylus body 20. The body further defines two aligned retaining apertures 224 for retaining the post 70 to the stylus body 20.

Figure 2:
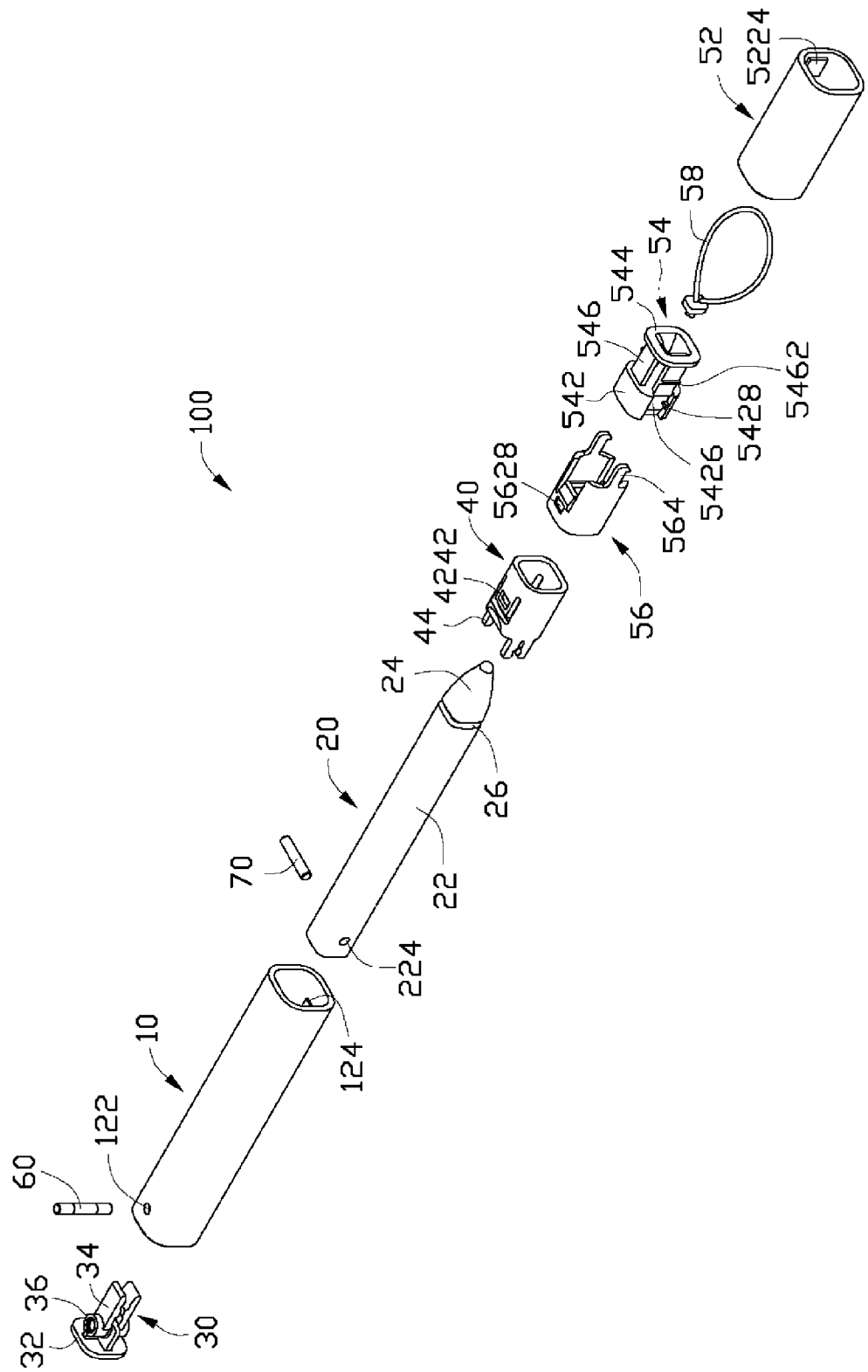
FIG. 2 is similar to the FIG. 1, but shown in another aspect.

Referring to FIGS. 1 and 2, the first stopping element 30 includes a plate 32 and a plunger 34 protruding from one side of the plate 32. The plunger 34 is inserted in the housing 10 and defines a retaining bore 36 therethrough. When the plunger 34 is inserted in the housing 10, the retaining bore 36 is aligned with the retaining holes 122, and the pin 60 is tightly fitted into the retaining bore 36 and the retaining holes 122 so the first stopping element 30 is mounted to the housing 10. The first stopping element 30 further defines a first stopping hole 342 therethrough. The first stopping hole 342 latches the post 70 therein to hold the stylus body 20 in a closed state like shown in FIGS. 4 and 5.

Figure 6:
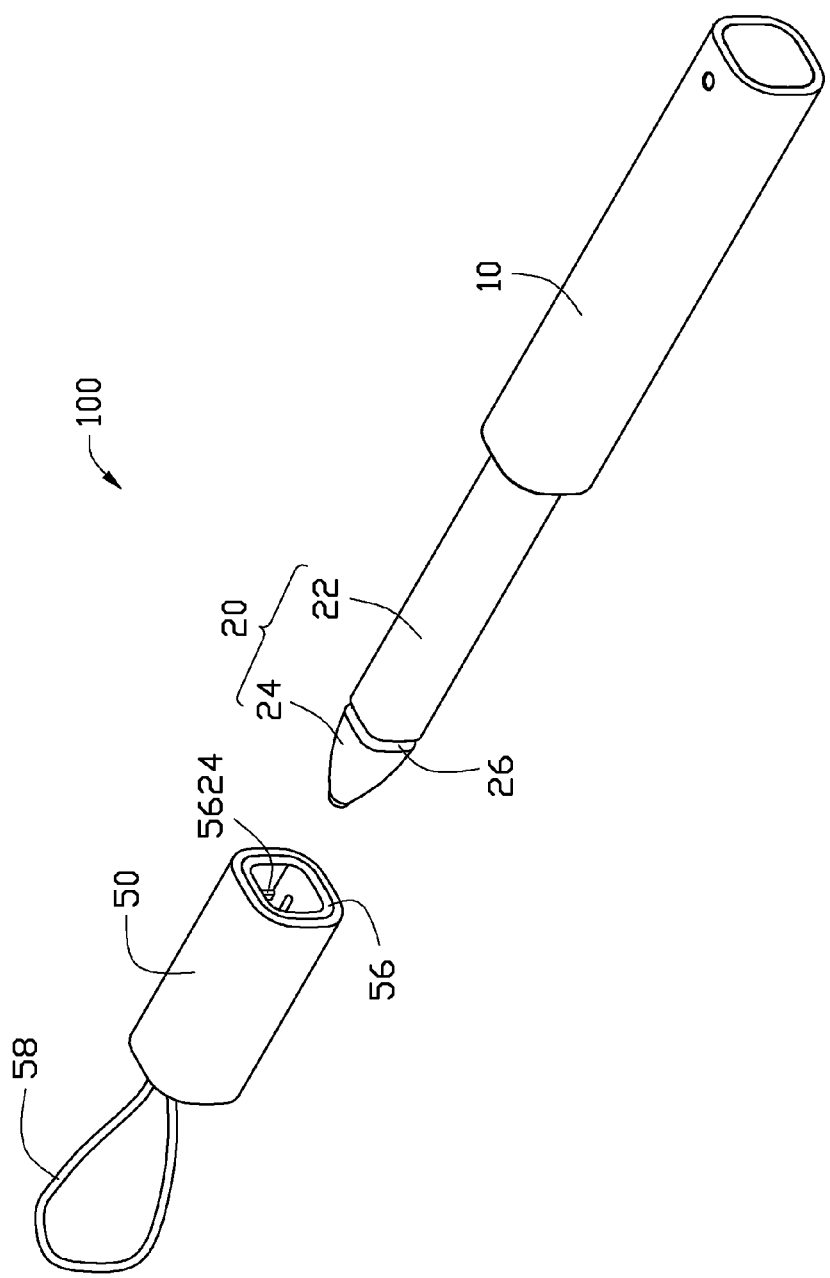
FIG. 6 is similar to FIG. 4, and where the stylus is in an extended state.

Referring to FIGS. 1 and 2, the second stopping element 40 includes a tubular main body 42 and two stopping portions 44 protruding one end of the main body 42. The main body 42 defines two opposite latching slots 4242 for latching with the blocks 124 to retain the second stopping element 40 to the housing 10. Each stopping portion 44 defines a second stopping hole 4422. The second stopping holes 4422 latch with the post 70 to hold the stylus body 20 in an extended state such as shown in FIG. 6.

Referring to FIGS. 1 and 2, the cap assembly 50 includes a cap 52, a resisting element 54 held in the cap 52, a strengthening element 56 held in the cap 52 and latching with the resisting element 54, and a cord 58 mounted on the resisting element 54. The cap 52 is tubular, which defines a chamber 524. The cap 52 further includes two latching portions 5222 protruding from an inner surface thereof and located near one end thereof, and two protrusions 5224 protruding from the inner surface thereof and located near another end thereof. The latching portions 5222 are for retaining the strengthening element 56 in the cap 52. The protrusions 5224 are for retaining the resisting element 54 in the cap 52.

Figure 3:
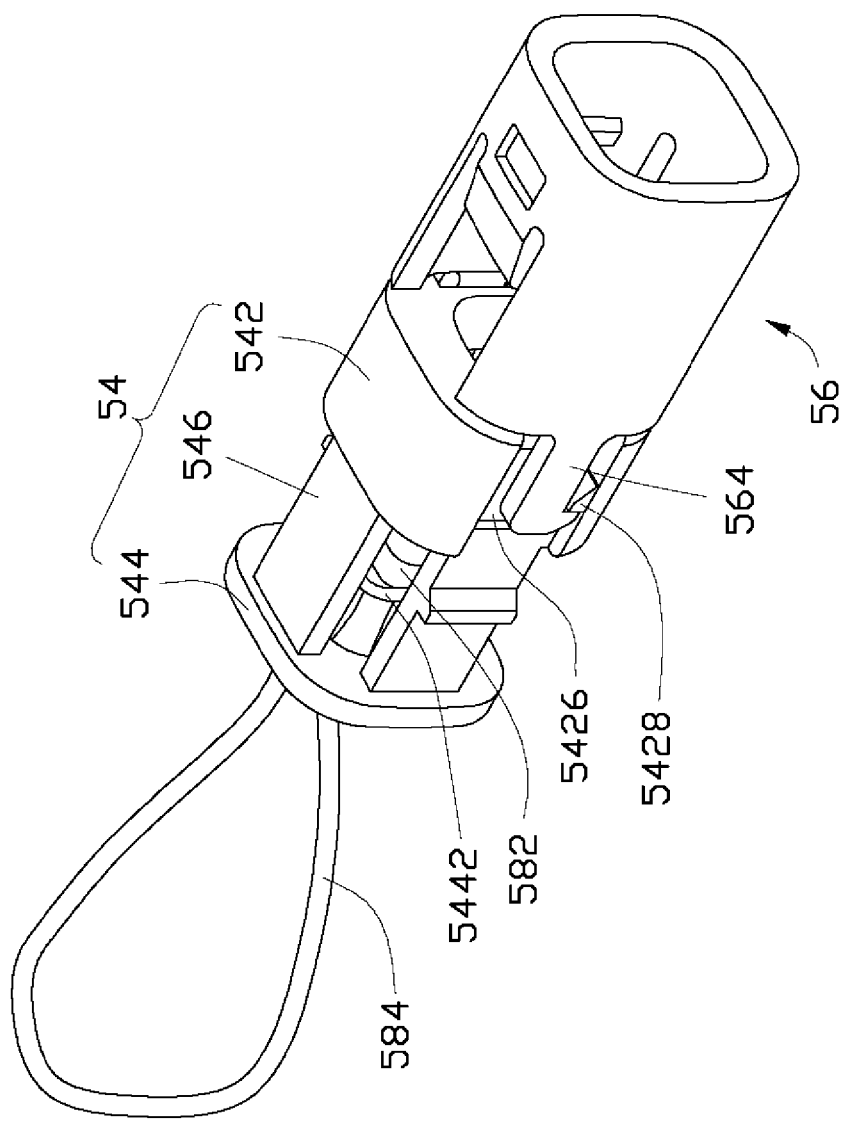
FIG. 3 is an enlarged and assembled view of a cap assembly shown in FIG. 1.

Referring to FIGS. 1-3, the resisting element 54 includes a resisting portion 542 for resisting against the head 24, a retaining board 544 and a plurality of connecting boards 546 for connecting the resisting portion 542 with the retaining board 544. The resisting portion 542 defines a receiving space 5422 for receiving the head 24. The receiving space 5422 has a shape and profile conforming to the head 24, so when the head 24 is received in the receiving space 5422, the head 24 resists an inner surface of the receiving space 5422. The resisting portion 542 further defines two opposite mounting grooves 5426 for mounting the strengthening element 56, and each mounting groove 5426 has a hook 5428 located therein for latching with the strengthening element 56. The retaining board 544 defines an opening 5442 for the cord 58 to pass through. Each connecting board 546 has a raised portion 5462 protruding therefrom, the protrusions 5224 are held between the retaining board 544 and the raised portion 5462 to retain the resisting element 54 in the cap 52.

Referring to FIGS. 1-3, the strengthening element 56 is tubular, includes two catches 564 protruding one end thereof, and two projections 5624 protruding from an inner surface thereof and two securing slots 5628 defined in an outer surface thereof. Each catch 564 latches one of the hooks 5428 to latch the strengthening element 56 to the resisting element 54. The projections 5624 snap into the retaining slot 26 to hold the cap assembly 50 on the stylus body 20. Each securing slot 5628 latches one of the latching portions 5222 therein so the strengthening element 56 is retained in the cap 52. The cord 58 passes through the opening 5442, and a node (e.g. knot) 582 formed one end thereof and is larger than the opening 5442, thereby the node 582 can not pass though the opening 5442 to prevent the cord 58 and the resisting element 54 from separating.

Referring to FIG. 1-5, in assembly, the first stopping element 30 is inserted in the receptacle 121 until the retaining bore 36 is aligned with the retaining holes 122. The pin 60 is tightly inserted into the retaining holes 122 and the retaining bore 36 so the first stopping element 30 is mounted in the housing 10. The post 70 is inserted in the retaining apertures 224 to retain the post 70 on the stylus body 20. The stylus body 20 is inserted in the receptacle 121 until the post 70 is latched in the first stopping hole 342. The second stopping element 40 is inserted in the receptacle 121 until the blocks 124 are latched in the latching slots 4242. The cord 58 passes through the opening 5442 until the node 582 resists the retaining board 544. The resisting element 54 is inserted in the chamber 524 until the protrusions 5442 are held between the retaining board 544 and the raised portions 5462 with the cord 58 exposed out of the chamber 524 (referring to FIG. 3). The strengthening element 56 is inserted in the chamber 524 until the catches 564 latches with the hooks 5428 and the latching portions 5222 latches in the securing slots 5628 to finish an assembled cap assembly 50 (referring to FIG. 5). Finally, the cap assembly 50 is positioned on the stylus body 20 to complete assembly of the stylus 100 with the projections 5624 of the strengthening element 56 engaging in the retaining slot 26.

Figure 4:
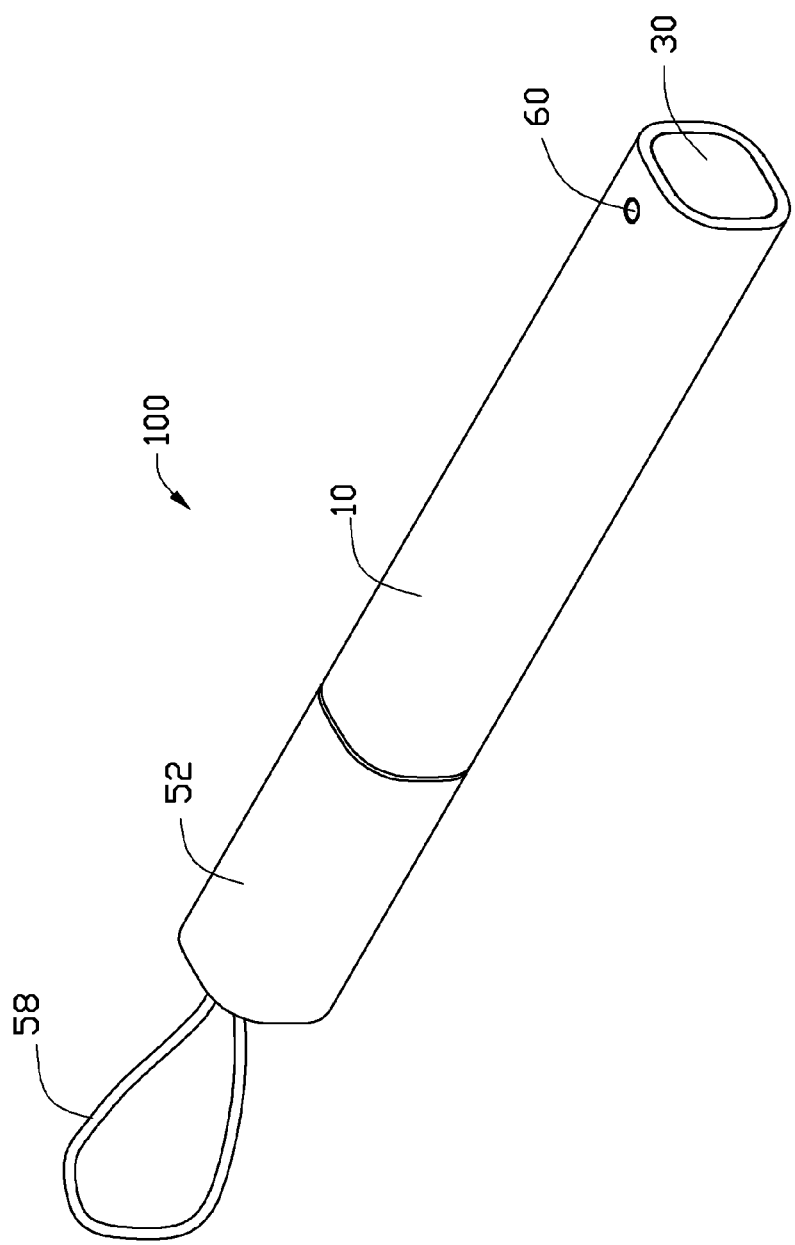
FIG. 4 is an assembled view shown in FIG. 1.
Figure 5:
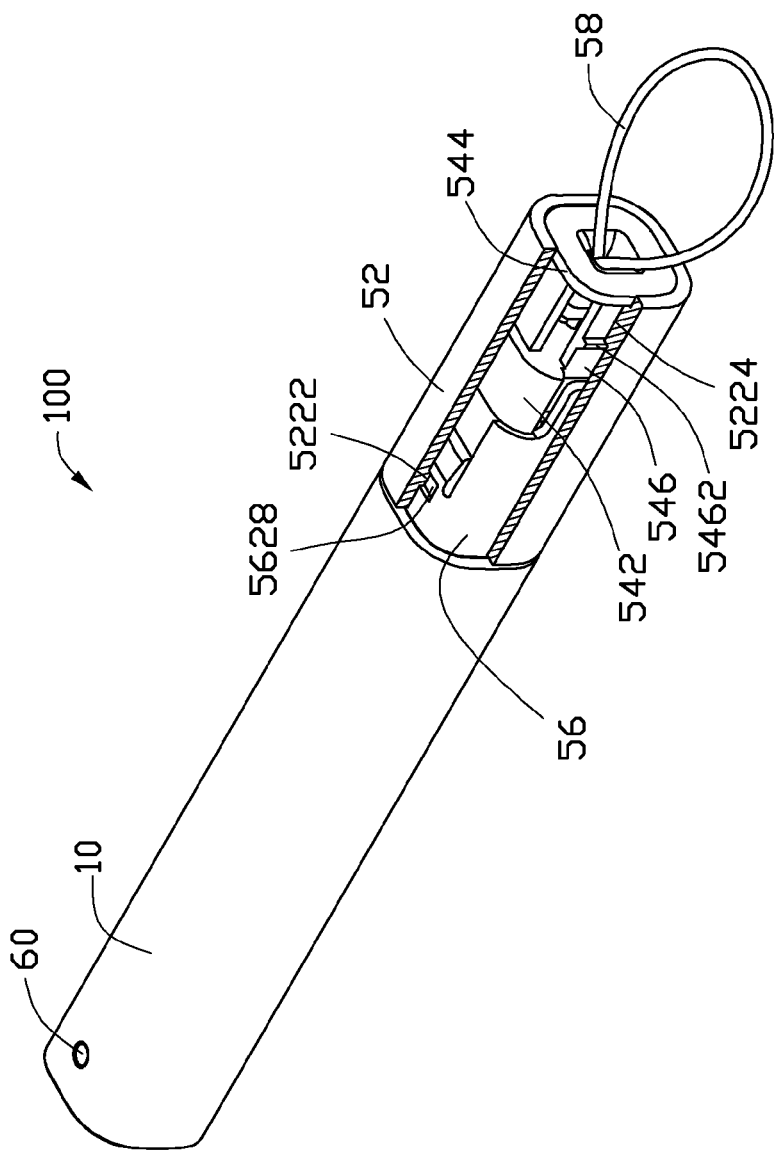
FIG. 5 is a cut-away view of FIG. 4

Referring to FIGS. 3-5, in operation, the cap assembly 50 is pulled away from the housing 10. Thus, the post 70 slides out from the first stopping hole 342 until in the second stopping holes 4422 so the stylus body 20 slides out of the housing 10 to extend the stylus 100. And then the cap assembly 50 is continued to be pulled until the projections 5624 slide out of the retaining slot 26 such as shown in FIG. 6. To retract the stylus body 20 in the housing 10, the cap assembly 50 covering the head 24 until the head 24 is accommodated in the receiving space 5422 and the inner surface of the receiving space 5422 resists the head 24. Then, pushing the cap assembly 50 toward the housing 10, the inner surface of the receiving space 5422 drives the head 24 to move relative to the housing 10 until the post 70 latches in the first stopping hole 342 again.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A cap assembly for protecting a head of a stylus, the cap assembly comprising:
   a hollow cap defining a chamber and having at least one protrusion protruding from an inner surface of the cap;
   a resisting element mounted in the chamber, the resisting element including a resisting portion, a retaining board, and a plurality of connecting boards connecting the resisting portion with the retaining board; the resisting portion defining a receiving space, the receiving space having a shape and profile conforming to the head so when the head is received in the receiving space, the head resists an inner surface of the receiving space; each connecting board having a raised portion protruding therefrom, the at least one protrusion of the cap held between the retaining board and the raised portion of the connecting board to retain the resisting element in the chamber.

2. The cap assembly as claimed in claim 1, wherein the cap assembly further includes a strengthening element mounted in the chamber, the strengthening element includes a securing slot defined in an outer surface thereof; the cap further includes a latching portion protruding from the inner surface thereof and latched in the securing slot to retain the strengthening element in the chamber.

3. The cap assembly as claimed in claim 2, wherein the strengthening element further includes a catch protruding therefrom; the resisting element further includes a hook latched with the catch.

4. A stylus, comprising:
   a housing defining a receptacle;
   a stylus body slidably mounted in the receptacle, the stylus body including a body and a head protruding from the body; and
   a cap assembly covering on the head, the cap assembly comprising:
      a hollow cap having a chamber defined therein and at least one protrusion protruding from an inner surface of the cap;
      a resisting element mounted in the chamber, the resisting element including a resisting portion, a retaining board, and a plurality of connecting boards connecting the resisting portion with the retaining board; the resisting portion having a receiving space defined therein, the receiving space having a shape and profile conforming to the head; so when the head being received in the receiving space, the head resists an inner surface of the receiving space; each connecting board having a raised portion protruding therefrom, the at least one protrusion of the cap held between the retaining board and the raised portion of the connecting board to retain the resisting element in the chamber.

5. The stylus as claimed in claim 4, wherein the cap assembly further includes a strengthening element mounted in the chamber, the strengthening element includes a securing slot defined in an outer surface thereof; the cap further includes a latching portion protruding from the inner surface thereof and latched in the securing slot to retain the strengthening element in the chamber.

6. The stylus as claimed in claim 5, wherein the strengthening element further includes a catch therefrom; the resisting element further includes a hook latched with the catch.

7. The stylus as claimed in claim 6, wherein the strengthening element further includes a projection protruding from the inner surface thereof; the head defines a retaining slot which latches the projection therein to hold the cap assembly on the stylus body.

8. A stylus, comprising:
a housing defining a receptacle;
a stylus body slidably mounted in the receptacle, the stylus body including a body and a head protruding from the body; and
a cap assembly covering on the head, the cap assembly comprising:
a hollow cap having a chamber defined therein and a latching portion protruding from an inner surface thereof;
a resisting element mounted in the chamber, the resisting element including a resisting portion that has a receiving space defined therein, the receiving space having a shape and profile conforming to the head;
a strengthening element mounted in the chamber, the strengthening element including a securing slot defined in an outer surface thereof; the latching portion latched in the securing slot to retain the strengthening element in the chamber;
wherein when the cap assembly moves toward the stylus body, an inner surface of the receiving space drives the head moving relative to the housing to retract the stylus body in the housing.

9. The stylus as claimed in claim 8, wherein the resisting element further includes a retaining board and a plurality of connecting boards connecting the resisting portion with the retaining board; the cap has at least one protrusion protruding the inner surface thereof; each connecting board has a raised portion protruding therefrom, the at least one protrusion of the cap are held between the retaining board and the raised portions of the connecting board to retain the resisting element in the chamber.

10. The stylus as claimed in claim 9, wherein the strengthening element further includes a catch therefrom; the resisting element further includes a hook latched with the catch.

11. The stylus as claimed in claim 10, wherein the strengthening element further includes a projection protruding from the inner surface thereof; the head defines a retaining slot which latches the projection therein to hold the cap assembly on the stylus body.

12. The stylus as claimed in claim 8, further comprising a first stopping element located near one end of the housing, a second stopping element located near the other end of the housing, and a post mounted on the stylus body, the post selectively latched with the first stopping element and the second stopping element.

13. The stylus as claimed in claim 12, wherein the housing further comprises two aligned retaining holes defined at one end thereof, the first stopping element comprises a plate and a plunger protruding from one side of the plate, the plunger defines a retaining bore therethrough, a pin is fitted into the retaining bore and the retaining holes so the first stopping element is mounted to the housing.

14. The stylus as claimed in claim 13, wherein the first stopping element further defines a first stopping hole therethrough, the first stopping hole latches the post therein to hold the stylus body in a closed state.

15. The stylus as claimed in claim 12, wherein the housing further comprises two opposite blocks protruding from an inner surface thereof, the second stopping element comprises a tubular main body, the main body defines two opposite latching slots for latching with the blocks to retain the second stopping element to the housing.

16. The stylus as claimed in claim 15, wherein the second stopping element further comprises two stopping portions protruding from one end of the main body, each stopping portion defines a second stopping hole, the second stopping holes latch with the post to hold the stylus body in an extended state.

* * * * *